(12) United States Patent
Wano

(10) Patent No.: US 7,345,726 B2
(45) Date of Patent: Mar. 18, 2008

(54) LIQUID CRYSTAL DISPLAY AND ELECTRONIC APPARATUS HAVING DIELECTRIC STRUCTURES AND COLORANT LAYERS

(75) Inventor: Hiromi Wano, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 400 days.

(21) Appl. No.: 10/962,697

(22) Filed: Oct. 13, 2004

(65) Prior Publication Data

US 2005/0110939 A1    May 26, 2005

(30) Foreign Application Priority Data

Oct. 29, 2003  (JP)  ............... 2003-369055

(51) Int. Cl.
G02F 1/1337 (2006.01)
G02F 1/1339 (2006.01)

(52) U.S. Cl. ............... 349/130; 349/106; 349/110; 349/155; 349/156; 349/157

(58) Field of Classification Search ............... 349/110, 349/130
See application file for complete search history.

(56) References Cited

U.S. PATENT DOCUMENTS

| | | | | |
|---|---|---|---|---|
| 4,470,667 | A | * | 9/1984 | Okubo et al. ............... 349/42 |
| 5,680,187 | A | * | 10/1997 | Nagayama et al. ......... 349/110 |
| 5,866,919 | A | * | 2/1999 | Kwon et al. ................ 257/59 |
| 6,493,050 | B1 | * | 12/2002 | Lien et al. ................. 349/106 |
| 6,788,375 | B2 | * | 9/2004 | Ogishima et al. .......... 349/130 |
| 2004/0201815 | A1 | * | 10/2004 | Yamamoto ................. 349/156 |

FOREIGN PATENT DOCUMENTS

| | | |
|---|---|---|
| JP | 09-096816 | 4/1997 |
| JP | 10-039318 | 2/1998 |
| JP | A-11-242226 | 9/1999 |
| JP | 2001-021894 | 1/2001 |
| JP | 2002-214622 | 7/2002 |
| JP | A-2002-350853 | 12/2002 |
| JP | 2003-098526 | 4/2003 |

* cited by examiner

*Primary Examiner*—Andrew Schechter
(74) *Attorney, Agent, or Firm*—Oliff & Berridge, PLC

(57) ABSTRACT

Exemplary embodiments provide a liquid crystal display capable of effectively reducing or preventing the alignment disorder of liquid crystal caused by an active element for switching a pixel, capable of achieving uniform and wide viewing angle display, and preferably capable of high quality color display. The liquid crystal display according to exemplary embodiments of the present invention includes an element substrate having a plurality of pixels, each pixel mainly including a pixel electrode and a TFD element; an opposite substrate opposing the element substrate; and a liquid crystal layer between both substrates. The liquid crystal layer includes liquid crystal with negative dielectric anisotropy, the initial alignment of molecules of the liquid crystal being vertical. A dielectric projection is provided on the inner side of the element substrate or the opposite substrate, the dielectric projection being located in the same position as the TFD element in plan view.

2 Claims, 8 Drawing Sheets

LIQUID CRYSTAL DISPLAY AND ELECTRONIC APPARATUS HAVING DIELECTRIC STRUCTURES AND COLORANT LAYERS

BACKGROUND OF THE INVENTION

1. Field of Invention

An exemplary embodiment of the present invention relates to a liquid crystal display and an electronic apparatus.

2. Description of Related Art

A related art transflective liquid crystal display uses ambient light in a well-lighted environment, similarly to a reflective liquid crystal display. On the other hand, in a poorly-lighted environment, the transflective liquid crystal display makes display visible with a backlight, similarly to a transmissive liquid crystal display. A typical transflective liquid crystal display includes a liquid crystal layer disposed between an upper substrate and a lower substrate. The inner surface of the lower substrate is provided with a reflective film made of metal, such as aluminum. The reflective film has an opening to transmit light and functions as a transflector. In this case, in the reflective mode, ambient light incident on the upper substrate passes through the liquid crystal layer, is reflected by the reflective film on the inner surface of the lower substrate, passes through the liquid crystal layer again, exits from the upper substrate, and then reaches the viewer. On the other hand, in the transmissive mode, the light from the backlight incident on the lower substrate passes through the liquid crystal layer via an opening in the reflective film, exits from the upper substrate, and then reaches the viewer. Therefore, with regard to the region where the reflective film is provided, the region where the opening is provided constitutes a transmissive display region, and the other region constitutes a reflective display region.

However, the related art transflective liquid crystal display has a problem in that the viewing angle in the transmissive display mode is narrow. This is because the optical design flexibility is restricted. Since the transflector is provided on the inner surface of the liquid crystal cell in order not to produce parallax, reflective display needs to be performed with only one polarizer provided at the viewer side. In order to address or solve this problem, Japanese Unexamined Patent Application Publication No. 2002-350853 discloses a novel transflective liquid crystal display including vertically aligned liquid crystal. It has the following characteristics:

(1) A "VA (vertical alignment) mode" is adopted. In the VA mode, molecules of liquid crystal with negative dielectric anisotropy are aligned vertically with respect to the substrate, and then tilted by an applied voltage.

(2) A "multi-gap structure" is adopted. In the multi-gap structure, the thickness of the liquid crystal layer (cell gap) is different between the transmissive display region and the reflective display region (see, for example, Japanese Unexamined Patent Application Publication No. 11-242226).

(3) An "alignment division structure" is adopted. The transmissive display region is a regular octagon in shape. A projection is provided in the center of the transmissive display region on the opposite substrate so that the liquid crystal molecules are tilted radially in all directions in the transmissive display region.

SUMMARY OF THE INVENTION

According to Japanese Unexamined Patent Application Publication No. 11-242226 and Japanese Unexamined Patent Application Publication No. 2002-350853, the direction in which the liquid crystal molecules tilt in the transmissive display region is controlled by a projection. However, these documents do not disclose how to control the direction in which the liquid crystal molecules tilt in the reflective display region. If the liquid crystal molecules tilt in random directions, a discontinuous line referred to as "disclination" appears at the border between different liquid crystal alignment regions and causes, for example, an afterimage. In addition, since alignment regions of the liquid crystal have different vision properties, non-uniformity will disadvantageously be visible when viewed from an angle.

Moreover, in an active-matrix liquid crystal display, an electric field is generated in the vicinity of the switching element by switching of the element. This electric field may cause alignment disorder of the liquid crystal and reduce contrast. However, the above documents do not contain a description concerning the alignment disorder of the liquid crystal in the region in which the switching element is disposed, and these documents do not consider this issue at all.

An exemplary embodiment of the present invention addresses or solves the above, and provides a liquid crystal display capable of effectively reducing or preventing the alignment disorder of liquid crystal caused by an active element to switch a pixel, capable of achieving uniform and wide viewing angle display, and preferably capable of high quality color display. Further, the present invention provides an electronic apparatus having a display unit capable of high quality display.

To address or solve the above, an exemplary embodiment of the present invention provides a liquid crystal display including an element substrate having a plurality of dot regions, each dot region including a pixel electrode and a switching element; an opposite substrate opposing the element substrate; and a liquid crystal layer between both substrates. The liquid crystal layer includes liquid crystal with negative dielectric anisotropy, the initial alignment of molecules of the liquid crystal being vertical. At least one of the plurality of dot regions is provided with a dielectric structure on the inner side of the element substrate or the opposite substrate, the dielectric structure being located in the same position as the corresponding switching element in plan view.

Since the dielectric structure provided in the same position as the switching element in plan view blocks the electric field generated by operation of the switching element, the alignment disorder of the liquid crystal molecules caused by the electric field is prevented effectively. In this way, light leakage around the switching element is reduced or prevented, and substantial aperture ratio of the pixel is enhanced. Therefore, an exemplary embodiment of the present invention provides a bright and high quality liquid crystal display.

In the liquid crystal display according to an exemplary embodiment of the present invention, the dielectric structure preferably projects from the element substrate or the opposite substrate to the liquid crystal layer. Since the thickness of the liquid crystal layer is partly reduced around the switching element, the alignment disorder of the liquid crystal caused by the electric field of the switching element is reduced or prevented from spreading to the pixel electrode even if the blocking effect of the dielectric structure cannot prevent the alignment disorder completely.

In the liquid crystal display according to an exemplary embodiment of the present invention, the dielectric structure may be in contact with both the element substrate and the opposite substrate. Since the dielectric structure is provided across the thickness of the liquid crystal layer, the electric field from the switching element is blocked more effectively. In addition, since the dielectric structure also functions as a spacer to keep the thickness of the liquid crystal layer, there is no need to provide a spacer separately, and manufacturing is easy and efficient.

In the liquid crystal display according to an exemplary embodiment of the present invention, the dielectric structure preferably covers the switching element. Since the electric field from the switching element is blocked effectively, alignment of the liquid crystal is enhanced.

In the liquid crystal display according to an exemplary embodiment of the present invention, the plurality of dot regions may be provided with different colors of colorant layers and may constitute color pixels, and different dielectric structures may have different shapes or sizes. In the pixel provided with the dielectric structure, brightness and chromaticity are enhanced since alignment of the liquid crystal is enhanced. In addition, the electric field blocking effect varies depending on shape and size of the dielectric structure. Therefore, shape or size of the dielectric structure is determined according to the color of the colorant layer so that the color balance among the dots can be tuned. In this way, bright and high quality color display is achieved.

In the liquid crystal display according to an exemplary embodiment of the present invention, the area of the corresponding dielectric structure preferably increases as the visibility of the colorant layer decreases.

In the liquid crystal display according to an exemplary embodiment of the present invention, the height of the corresponding dielectric structure preferably increases as the visibility of the colorant layer decreases.

As described above, in the liquid crystal display according to an exemplary embodiment of the present invention, brightness and chromaticity of the dot region can be tuned by varying the size of the corresponding dielectric structure. As the visibility of the color of the colorant layer decreases, the size of the dielectric structure increases so that the dot region becomes relatively bright. In this way, the color balance among the dot regions is tuned, and a liquid crystal display capable of high quality display is achieved.

In the liquid crystal display according to an exemplary embodiment of the present invention, each color pixel may consist of three dot regions provided with red, green, and blue colorant layers, and the dot region having the blue colorant layer may be provided with the dielectric structure. Since the luminance and the chromaticity are enhanced in the blue dot having the lowest visibility, the color balance among the three colors of dots is tuned, and high quality display with no coloring is achieved.

In the liquid crystal display according to an exemplary embodiment of the present invention, the color pixel may include three dot regions provided with red, green, and blue colorant layers, and the dot region having the blue or red colorant layer may be provided with the dielectric structure. Since providing the dielectric structure in the two colors (blue and red) of dots having low visibility tunes the color balance among the dots, high quality display with no coloring is achieved.

In the liquid crystal display according to an exemplary embodiment of the present invention, each dot region may be provided partly with a reflective layer, and the switching element may be disposed in the region occupied by the reflective layer in plan view. In this case, the liquid crystal display is a transflective color liquid crystal display and is provided selectively with the dielectric structure according to the color of the colorant layer. In the transflective color liquid crystal display, since the number of times of passing of light through the colorant layer is different between transmissive display and reflective display, the chromaticity is different between transmissive display and reflective display. In the liquid crystal display according to an exemplary embodiment of the present invention, the chromaticity can be tuned depending on the shape, size, and the presence or absence of the dielectric structure. In this case, the chromaticity in the reflective display region can be tuned by using the operation of the dielectric structure. Therefore, there can be provided a liquid crystal display with no difference in chromaticity between transmissive display and reflective display and having an excellent color balance among the dots.

In the liquid crystal display according to an exemplary embodiment of the present invention, the dielectric structure may be made of the same material as the colorant layers. Since the dielectric projections can be formed together with the colorant layers in the process of forming the colorant layers, a liquid crystal display capable of being manufactured easily and efficiently is provided.

In the liquid crystal display according to an exemplary embodiment of the present invention, the dielectric structure may be formed by laminating the plurality of colors of colorant layers. Since a plurality of colors of dielectric structures are laminated to show a dark color having less impact on display, the contrast of display is enhanced. In addition, the dielectric structures can be formed together with the colorant layers in the process of forming the colorant layers.

In the liquid crystal display according to an exemplary embodiment of the present invention, the dielectric structure may have a cylindrical shape, a prismatic shape, a conical shape, or a pyramidal shape.

In the liquid crystal display according to an exemplary embodiment of the present invention, the dielectric structure preferably has a light blocking effect. Since there is no effect of light transmission through the dielectric structure and of coloring on display, and the dielectric structure functions to shield the switching element, a liquid crystal display with high quality and high reliability is provided.

An electronic apparatus according to an exemplary embodiment of the present invention includes the liquid crystal display described above. In this way, an electronic apparatus having a bright and high quality liquid crystal display is provided.

DETAILED DESCRIPTION OF PREFERRED EMBODIMENTS

First Exemplary Embodiment

Figure 1:
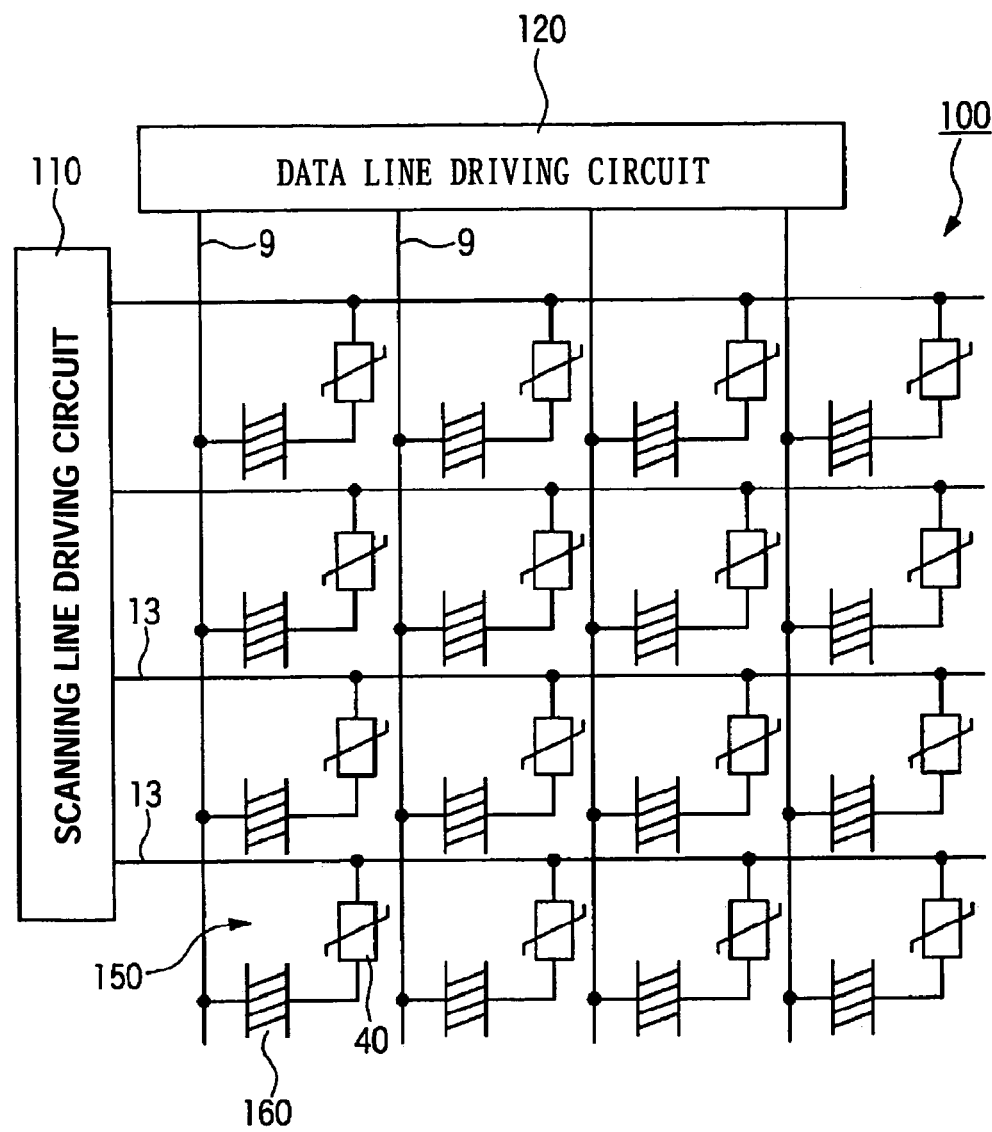
FIG. 1 is a schematic circuit diagram of the liquid crystal display according to a first exemplary embodiment.
Figure 2:
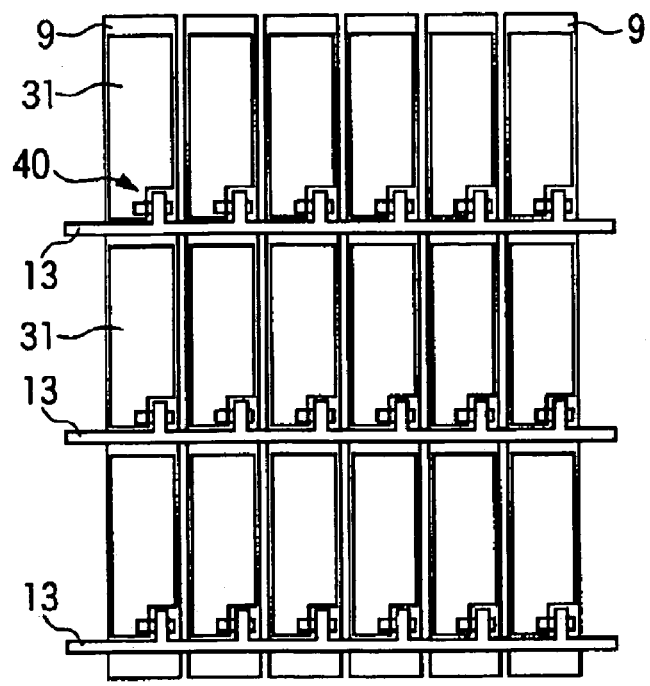
FIG. 2 is a plan view of electrodes.
Figure 3:
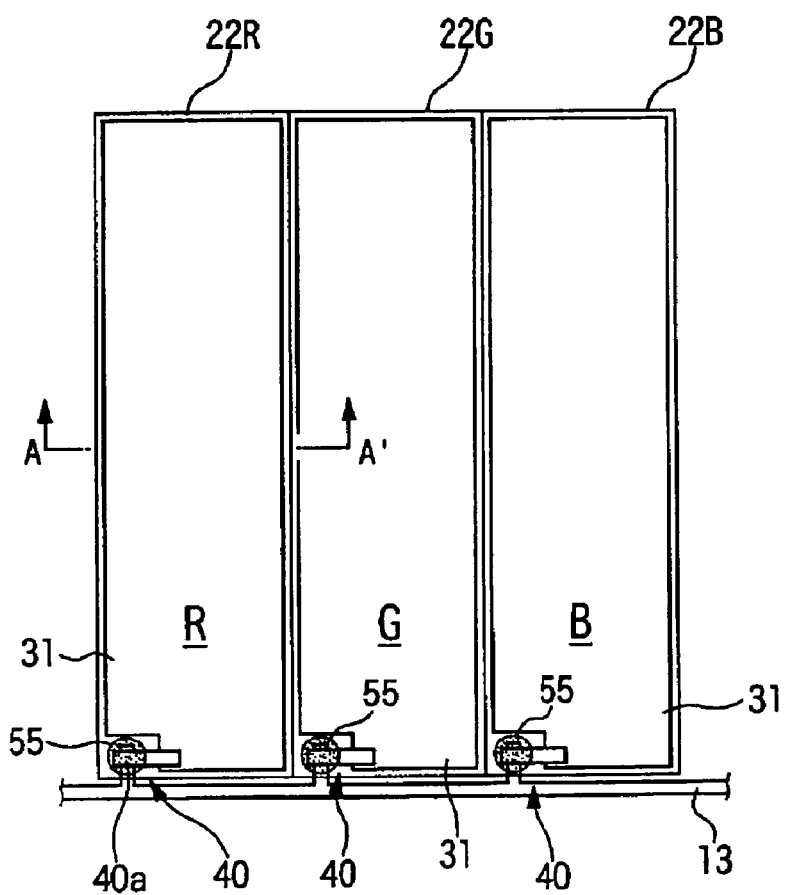
FIG. 3 is a plan view of a pixel.
Figure 4:
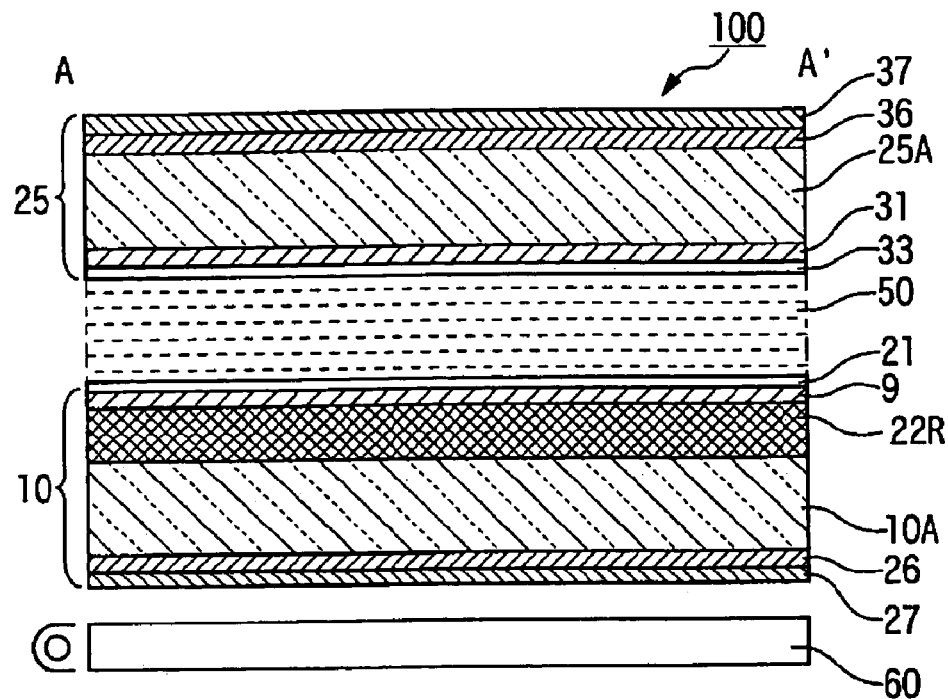
FIG. 4 is a sectional view taken along plane A-A' of FIG. 3.

FIG. 1 is a circuit diagram of the liquid crystal display of a first exemplary embodiment according to the present invention. FIG. 2 is a schematic plan view showing electrodes. FIG. 3 is a plan view showing the structure of one pixel. FIG. 4 is a sectional view.

The liquid crystal display shown in these figures is an active-matrix transmissive color liquid crystal display including TFD (thin film diode) elements (nonlinear diode elements) functioning as switching elements. The liquid crystal display of this exemplary embodiment is a vertical alignment mode liquid crystal display having a liquid crystal layer formed of liquid crystal with negative dielectric anisotropy and the initial alignment of molecules of the liquid crystal is vertical.

As shown in FIG. 1, the liquid crystal display 100 according to the present exemplary embodiment includes a scanning line driving circuit 110 and a data line driving circuit 120. In the liquid crystal display 100, there are criss-crossed signal lines, that is to say, a plurality of scanning lines 13 and a plurality of data lines 9. The scanning lines 13 are connected to the scanning line driving circuit 110. The data lines 9 are connected to the data line driving circuit 120. In each pixel region 150, a TFD element 40 and a liquid crystal display element 160 (liquid crystal layer) are connected in series between a scanning line 13 and a data line 9. In the present exemplary embodiment, the TFD element 40 is connected to the scanning line 13, and the liquid crystal display element 160 is connected to the data line 9. Inversely, the TFD element 40 may be connected to the data line 9, and the liquid crystal display element 160 may be connected to the scanning line 13.

Next, the planar structure of electrodes provided in the liquid crystal display according to the present exemplary embodiment is described below with reference to FIG. 2. As shown in FIG. 2, in the liquid crystal display according to the present exemplary embodiment, pixel electrodes 31 are arranged in a matrix, each pixel electrode 31 being connected to the scanning line 13 via the TFD element 40. Opposite the pixel electrodes 31 there are arranged common electrodes 9 in stripes. The common electrodes 9 form the data lines shown in FIG. 1, and they are stripes crisscrossing the scanning lines 13. In the present exemplary embodiment, a region where a pixel electrode 31 is provided forms a dot region. Each of the dot regions arranged in a matrix is the unit of display.

The TFD element 40 is a switching element connecting the scanning line 13 and the pixel electrode 31. The TFD element 40 has, for example, an MIM (Metal Insulator Metal) structure including a first conductive film made mainly of tantalum, an insulating film thereon made mainly of tantalum oxide, and a second conductive film further thereon made mainly of chromium. The first conductive film is connected to the scanning line 13, and the second conductive film is connected to the pixel electrode 31.

The structure of a pixel of the liquid crystal display 100 according to the present exemplary embodiment is described below with reference to FIGS. 3 and 4.

FIG. 3 is a plan view showing a pixel of the liquid crystal display 100 viewed from the opposite substrate 25 to be hereinafter described. FIG. 4 is a sectional view taken along plane A-A' of FIG. 3. The liquid crystal display 100 has dot regions. Each dot region is mainly composed of a substantially rectangular pixel electrode 31 and a TFD element 40. The pixel electrode 31 is disposed between two scanning lines 13 extending horizontally in FIG. 2, and opposite the common electrode 9. Three dot regions shown in FIG. 3 are provided with a red colorant layer 22R, a green colorant layer 22G, and a blue colorant layer 22B, respectively. Each colorant layer is almost entirely covered by the pixel electrode 31. The set of three dot regions form a pixel capable of color display. A color filter of the present liquid crystal display consists of the above three kinds of colorant layers.

Additionally, as shown in FIG. 3, a dielectric projection (dielectric structure) 55 is provided under the TFD element 40 of each dot region of the liquid crystal display 100 according to the present exemplary embodiment. The dielectric projection 55 is made of a dielectric material and it has a circular shape in plan view. As described in detail below, this dielectric projection 55 projects from the element substrate 25 or the opposite substrate 10 to the liquid crystal layer 50.

Figure 5:
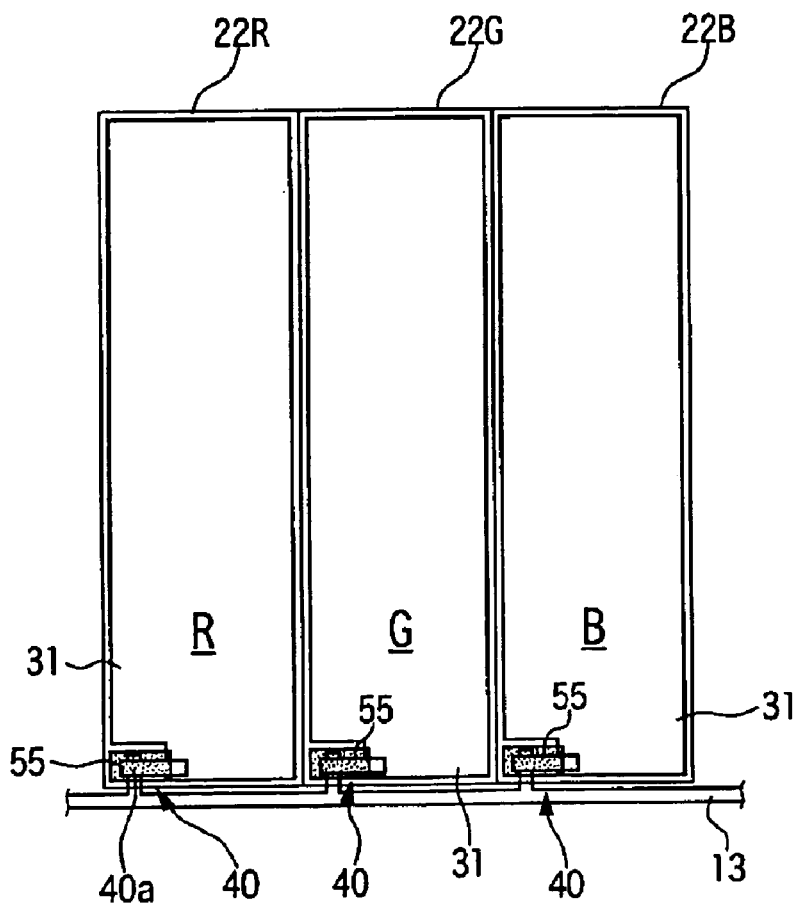
FIG. 5 is a plan view of a pixel showing another example of the dielectric structure.

The dielectric projection 55 may be made of for example, insulating resin materials, or inorganic insulating materials, such as oxide silicon. For its pattern formation, known or related art photo-lithography techniques or liquid discharging techniques may be used. Although the dielectric projection 55 has a circular shape in plan view in FIG. 3, it may have a rectangular shape in plan view as shown in a plan view of a pixel of FIG. 5. Alternatively, it may have other polygonal shapes or elliptical shapes.

As shown in FIG. 4, the liquid crystal display 100 includes a liquid crystal panel and a backlight (lighting unit) 60 disposed behind the liquid crystal panel. The liquid crystal panel includes an element substrate 25, an opposite substrate 10 disposed opposite the element substrate 25, and a liquid crystal layer 50 sandwiched between the element substrate 25 and the opposite substrate 10. The backlight 60 faces the outer surface of the element substrate 10. The liquid crystal layer 50 is made of liquid crystal with negative dielectric anisotropy, the initial alignment of molecules of the liquid crystal being vertical.

The element substrate 25 includes a substrate body 25A made of a transparent material such as glass and quartz. On the inner surface of the substrate body 25A facing the liquid crystal layer 50, a pixel electrode 31 and a vertical alignment film 33 are laminated in this order. The pixel electrode 31 is made of a transparent conductive material such as indium tin oxide (ITO). On the outer surface (the opposite surface from the liquid crystal layer 50) of the substrate body 25A, a retardation film 36 and a polarizer 37 are laminated in this order. Although not shown in FIG. 4, on the inner surface of the element substrate 25, there are provided the scanning lines 13 and TFD elements 40 shown in FIG. 3.

The opposite substrate 10 includes a substrate body 10A made of a transparent material such as glass and quartz. On the inner surface of the substrate body 10A facing the liquid crystal layer 50, there are laminated a colorant layer 22R, a common electrode 9, and a vertical alignment film 21 in this order. The common electrode 9 is made of a transparent conductive material, such as ITO. On the outer surface of the substrate body 10A, a retardation film 26 and a polarizer 27 are laminated in this order.

The retardation films 36 and 26 included in the element substrate 25 and the opposite substrate 10 respectively cooperate with the polarizers 37 and 27 respectively, and function as circular polarizers which circularly polarize light to be incident on the liquid crystal layer 50. For example, a quarter retardation film, and a lamination of a quarter retardation film and a half retardation film may be used as the retardation films 36 and 26. The liquid crystal layer 50 achieves a predetermined retardation of the incident circularly polarized light regardless of alignment direction of liquid crystal molecules when a voltage is applied, and enhances substantial aperture ratio, thereby enhancing display luminance. Adding a negative C-plate (a retardation film whose optical axis is in the thickness direction) to the retardation film 36 provided at the front side of the liquid crystal display 100 achieves the viewing angle compensation function.

Figure 6:
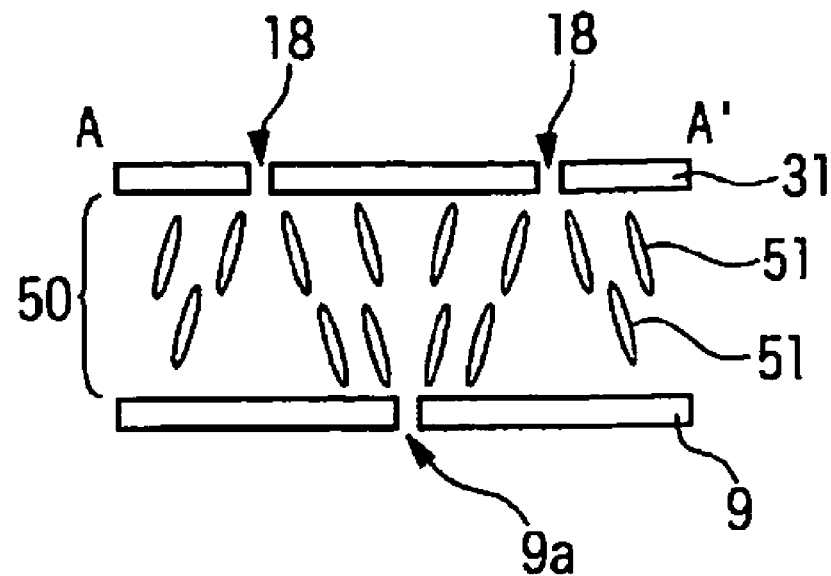
FIGS. 6(a) and 6(b) are schematic sectional views showing examples of the alignment controlling device.
Figure 6:
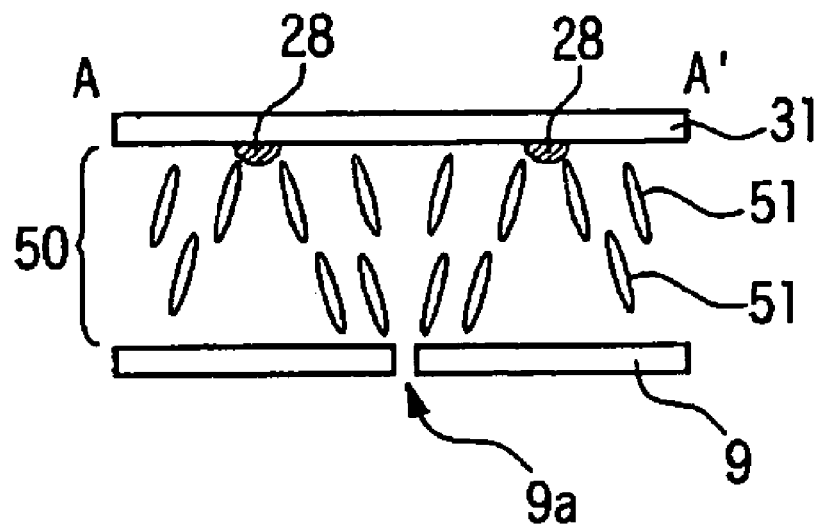
Figure 7:
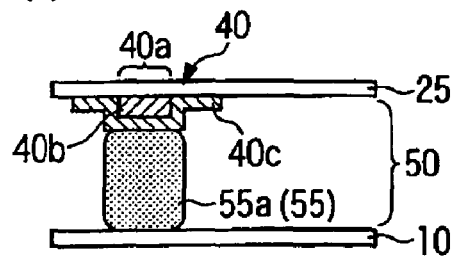
FIGS. 7(a) to 7(g) are schematic sectional views for explaining the dielectric structure.
Figure 7:
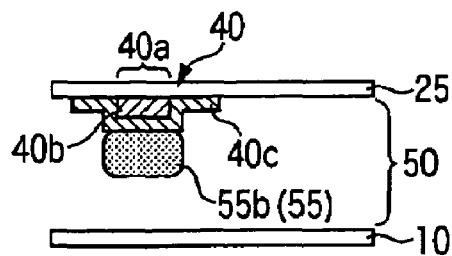
Figure 7:
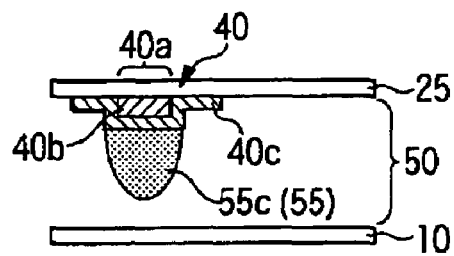
Figure 7:
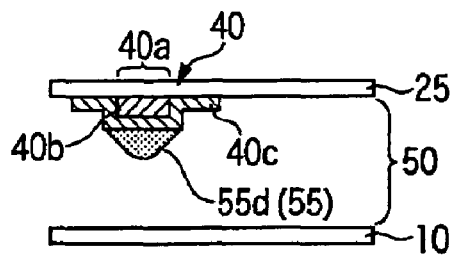
Figure 7:
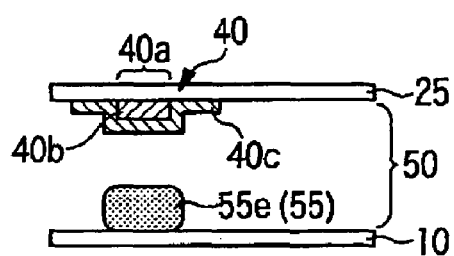
Figure 7:
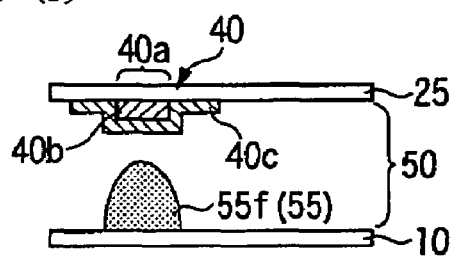
Figure 7:
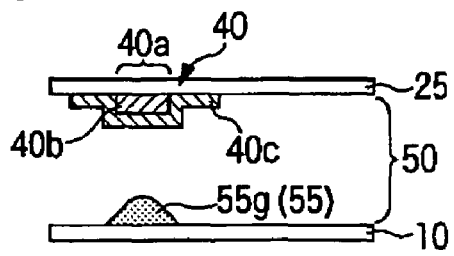

In the liquid crystal display 100 according to the present exemplary embodiment, the vertical alignment films 21 and 33 sandwiching the crystal layer 50 therebetween are not provided with treatment, such as rubbing. Therefore, in order to control alignment of the liquid crystal molecules when a voltage is applied, the pixel electrode 31 and/or the common electrode 9 are/is provided with an alignment controlling device, although not shown in FIGS. 3 and 4. FIGS. 6(a) and 6(b) illustrate the alignment controlling device, and are sectional views taken along plane A-A' of FIG. 3.

When a voltage is applied to liquid crystal with negative dielectric anisotropy aligned between the vertical alignment films 21 and 33 which are not provided with treatment such as rubbing, the liquid crystal molecules tilt in random directions because there is no restriction of direction in which the liquid crystal molecules tilt. In this case, a discontinuous line called "disclination" appears at the border between different liquid crystal alignment regions (liquid crystal domains) and causes, for example, an afterimage. In addition, since the above liquid crystal domains have different vision properties, the liquid crystal display has a problem where non-uniformity is visible when viewed from an angle. In order to address or solve this problem, in the liquid crystal display according to the present exemplary embodiment, an alignment controlling device shown in FIGS. 6(a) and 6(b) may also be used.

As shown in FIG. 6(a), the pixel electrode 31 and the common electrode 9 are provided with opening slits 18 and 9a, respectively, to control the direction in which the liquid crystal molecules 51 in vertical alignment mode tilt when a voltage is applied. These opening slits 18 and 9a are linear and extend perpendicular to the drawing. In each dot region shown in the plan view of FIG. 3, the opening slits 18 and 9a may be straight or bent lines extending vertically or horizontally.

When a voltage is applied between the pixel electrode 31 and the common electrode 9, the liquid crystal molecules 51 tilt toward both sides of the opening slits 18 and 9a. The liquid crystal layer 50 is thus divided into a plurality of liquid crystal domains by the opening slits 18 and 9a. By forming a plurality of liquid crystal domains as described above, a wide viewing angle and high contrast display are achieved. In addition, by fixing the borders between domains to the positions of the opening slits 18 and 9a, an afterimage and non-uniformity when viewed from an angle are prevented effectively. Thus, high quality display with a high level of visibility is achieved.

The ridges 28 shown in FIG. 6(b) can also be used as an alignment controlling device. The ridges 28 are made of, for example, insulating resin material and provided on the pixel electrode 31. In the case of the present exemplary embodiment, the ridges 28 extend perpendicular to the drawing. The liquid crystal molecules 51 are tilted along the slopes of the ridges 28 as in the case of pre-tilting. When a voltage is applied, the liquid crystal molecules 51 tilt toward both sides of the ridges 28. Therefore, the same alignment controlling function as in the case of opening slits 18 shown in FIG. 6(a) is achieved.

The ridges 28 may also be provided on the common electrode 9. In FIG. 6(a), instead of the opening slit 9a, a ridge may be provided on the common electrode 9 between the slits 18.

As described above, in the vertical alignment mode liquid crystal display, the electrode is provided with an alignment controlling device to control the tilting direction of the liquid crystal molecules when a voltage is applied. A very high voltage is needed to switch the TFD element 40 on/off. Consequently, it is difficult to control the alignment of the liquid crystal because of an intense electric field generated around the element. Therefore, in the related art or known liquid crystal display, contrast is maintained by covering the region including TFD elements 40 with a light shielding film or a black matrix. However, the technique of covering the TFD element 40 and its vicinities as described above has a problem where the aperture ratio is reduced.

On the other hand, in the liquid crystal display 100 according to the present exemplary embodiment, a dielectric projection 55 is provided under the TFD element 40. Therefore, when the TFD element 40 operates, an electric field generated around the element is blocked. The alignment disorder of the liquid crystal molecules caused by the electric field is thus reduced or prevented effectively. Non-uniformity of display around the element is thus reduced or eliminated, and excellent display is achieved. In addition, the part covered by a light shielding film and so on in the related art or known technique can be used for display. Therefore, bright display is achieved by enhancement in aperture ratio.

The dielectric projection 55 blocking the electric field generated around the TFD element 40 as described above is provided so as to at least cover the element portion (the region through which an electric charge passes when the element operates) 40a. In order to block the electric field more effectively, it is preferable to cover the entire TFD element 40.

A plurality of examples of the dielectric projection 55 are described below with reference to FIGS. 7(a)-7(g). FIGS. 7(a) to 7(g) are sectional views showing examples of the dielectric projection 55. These figures are schematic sectional views of the liquid crystal display 100 taken along the plane crossing the TFD element 40 of FIG. 3 or 5. FIGS. 7(a)-7(g) show the element portion 40a of the TFD element-40 where a first conductive film 40b and a second conductive film 40c face each other via an insulating film (not shown).

The dielectric projection 55a shown in FIG. 7(a) is located on the element portion 40a, and it is in contact with the inner surface of the element substrate 25 and that of the opposite substrate 10. That is to say, it also functions as a spacer for keeping thickness of the liquid crystal layer 50 (cell gap). Therefore, the dielectric projections 55a capable of effectively blocking the intense electric field around the TFD element 40 can be formed by using the related art or known process of forming spacers without increasing the number of man-hours or complicating the process. Thus, a high quality liquid crystal display can be manufactured at low cost.

Next, in FIG. 7(b) to 7(d), dielectric projections 55b to 55d are provided on the TFD element 40 of the element substrate 25, projecting to the liquid crystal layer 50. The dielectric projection 55b has a cylindrical shape, the dielectric projection 55c has a hemispherical shape, and the dielectric projection 55d has a conical shape. The dielectric projection 55 according to the present exemplary embodiment may have any of the above shapes. Any dielectric projection 55 can reduce or prevent the alignment disorder of the liquid crystal caused by the electric field generated around the TFD element 40.

Next, in FIGS. 7(e) to 7(g), dielectric projections 55e to 55g are provided opposite the TFD element 40 of the element substrate 25, projecting from the opposite substrate 10. The dielectric projection 55e has a cylindrical shape, the dielectric projection 55f has a hemispherical shape, and the dielectric projection 55g has a conical shape. These examples also have the effect of reducing or preventing the alignment disorder of the liquid crystal caused by the electric field generated around the TFD element 40, because the thickness of the liquid crystal layer between the TFD element 40 and the opposite substrate 10 is reduced and it is hard for the alignment disorder of the liquid crystal to spread in the planar direction.

In addition, in the present exemplary embodiment, the dielectric projections 55a and 55e to 55g projecting from the opposite substrate 10 to the liquid crystal layer 50 may be formed of: part of the colorant layer 22R, 22G, or 22B; a black matrix provided around the dot region for separating the colorant layers; or a laminated film of a plurality of colorant layers. In these cases, the dielectric projections 55 can be formed together with color filters in the process of forming color filters. Thus, a liquid crystal display capable of being manufactured efficiently can be provided.

Although a vertical alignment mode liquid crystal display 100 having TFD elements 40 as switching elements is described in the above exemplary embodiments, the present invention is not limited to the above exemplary embodiments. The present invention may also be applied to an active-matrix liquid crystal display having TFT (thin film transistor) elements as switching elements. In addition, as an alignment mode of liquid crystal, a parallel alignment mode and a twisted alignment mode may be applied. In the case where TFT element 40 are used as switching elements, it is preferable that the dielectric projection (dielectric structure) 55 be disposed on the channel region (gate electrode) of the TFT element, and provided so as to cover the region including the source region and the drain region of the TFT element.

EXAMPLES

The present inventor verified the effect of the above dielectric projection 55 by manufacturing and evaluating a liquid crystal display. The verified results are reported below.

Based on the transmissive liquid crystal display 100 according to the above exemplary embodiment, a liquid crystal display having dielectric projections 55a shown in FIG. 7(a) (Sample 1), and a liquid crystal display having dielectric projections 55e shown in FIG. 7(e) (Sample 2) are manufactured. Further, for comparison, a liquid crystal display having no dielectric projections 55 (Sample 3) is manufactured, the other structure being the same. In the liquid crystal display of Sample 1, cylindrical dielectric projections (cylindrical spacers) 55a having a diameter of 10 μm and a height equal to the thickness of the liquid crystal layer are formed on the TFD element from a resin material. In the liquid crystal display of Sample 2, cylindrical dielectric projections 55e having a diameter of 10 μm and a height of half the thickness of the liquid crystal layer are formed in positions in the opposite substrate 10 facing the TFD elements 40 across the liquid crystal layer 50.

Next, the liquid crystal displays of the above Samples 1 to 3 are operated and the transmittance is measured by making parallel light incident on the back side and detecting it on the opposite side. The measurement results are shown in Table 1 below. The transmittance appearing in Table 1 is normalized by the transmittance of air (100%).

As shown in Table 1, in the liquid crystal displays of Sample 1 and Sample 2 having the structure according to an exemplary embodiment of the present invention, the transmittance is highly enhanced in comparison with related art or known Sample 3 having no dielectric projections 55. It is verified that the dielectric projections 55 disposed in the positions facing the TFD elements 40 highly enhance the brightness of the liquid crystal display. In the liquid crystal display of Sample 2 having the dielectric projections 55e projecting partly to the liquid crystal layer 50, there is obtained a transmittance comparable to Sample 1 having the dielectric projection 55 extending across the thickness of the liquid crystal layer 50. It is verified that reduction in the thickness of the liquid crystal layer on the TFD element 40 considerably reduces or prevents the alignment disorder caused by the electric field around the element from spreading into the liquid crystal layer.

TABLE 1

|  | Transmittance |
| --- | --- |
| Sample 1 | 27.3(%) |
| Sample 2 | 25.7(%) |
| Sample 3 | 9.8(%) |

Second Exemplary Embodiment

Figure 8:
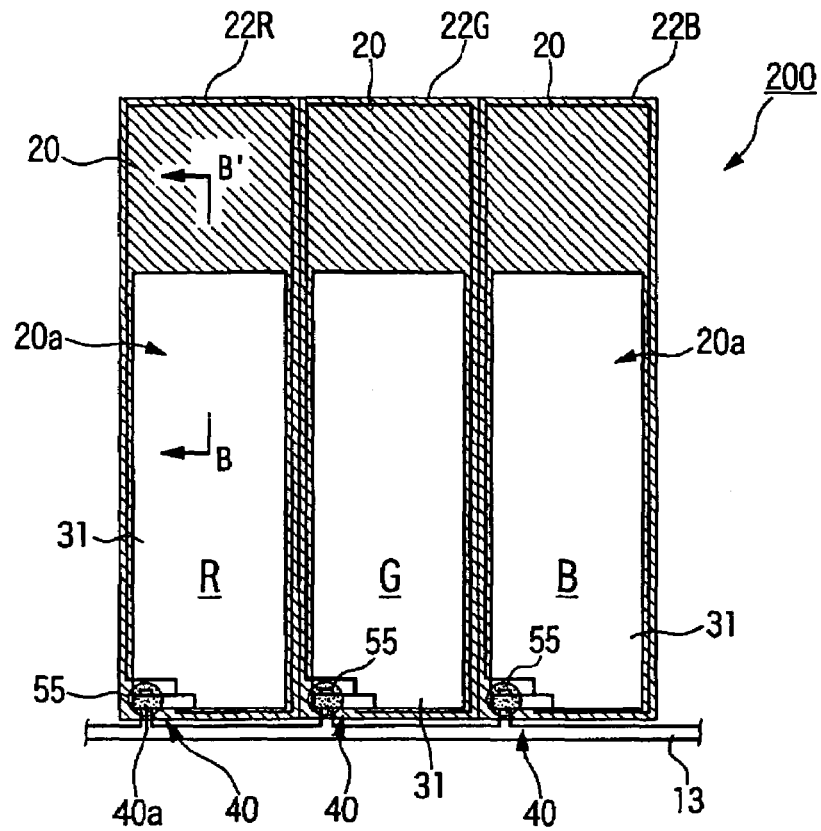
FIG. 8 is a plan view of a pixel in the liquid crystal display according to a second exemplary embodiment.
Figure 9:
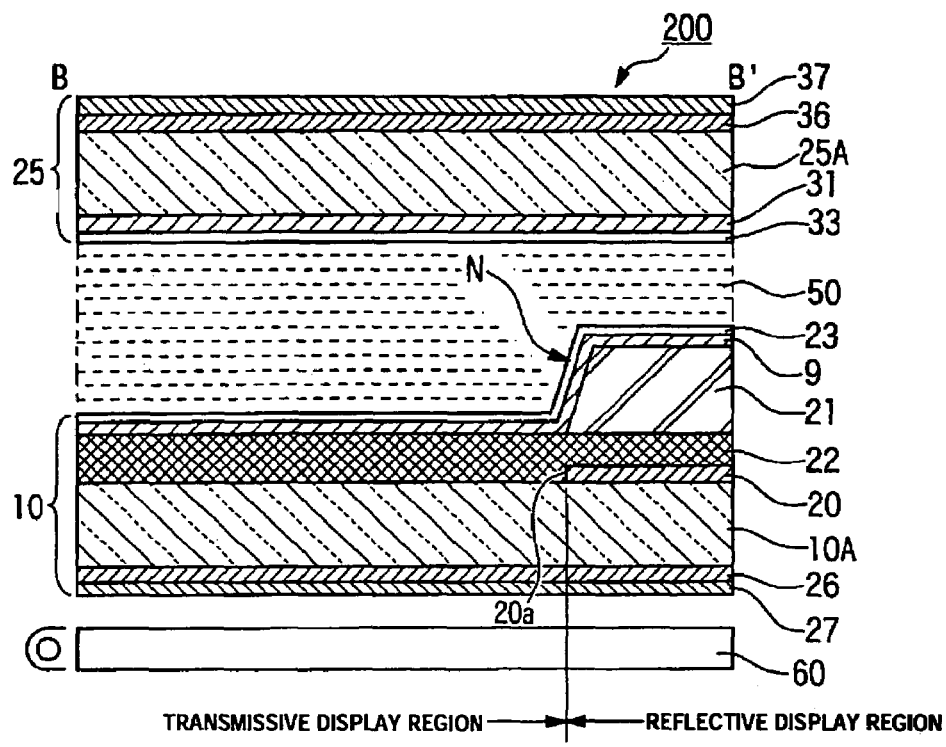
FIG. 9 is a sectional view taken along plane B-B' of FIG. 8.

A second exemplary embodiment according to the present invention is described below with reference to FIGS. 8 and 9. FIG. 8 is a plan view of a pixel of the liquid crystal display 200 according to the present exemplary embodiment, and FIG. 9 is a sectional view taken along plane B-B' of FIG. 8. The liquid crystal display 200 according to the present exemplary embodiment has the same basic configuration as the liquid crystal display 100 according to the first exemplary embodiment, and its circuit configuration and electrode configuration are the same as those of the liquid crystal display 100 shown in FIGS. 1 and 2. Therefore, in FIGS. 8 and 9, the same reference numerals will be used to designate the same components as those of the liquid crystal display 100 according to the first exemplary embodiment, so that the detailed description will be omitted.

As shown in FIG. 8, the liquid crystal display 200 according to the present exemplary embodiment is a transflective liquid crystal display. Each dot region thereof is partly provided with a reflective layer 20. The reflective layer 20 is a frame-like member provided under the pixel electrode 31, and it is made of a light-reflective thin film of metal, such as aluminum and silver.

A dielectric projection 55 is provided under the TFD element 40 in each dot region. The dielectric projection 55 may have any shape shown in FIGS. 7(*a*)-7(*g*).

As shown in FIG. 9, the liquid crystal display 200 has a structure in which a liquid crystal layer 50 is sandwiched between an element substrate 25 and an opposite substrate 10 disposed opposite each other. In the present exemplary embodiment, the opposite substrate 10 has a structure in which a reflective layer 20, a colorant layer 22R, a liquid crystal layer thickness reducing layer 21, a common electrode 9, and a vertical alignment film 23 are laminated in this order on the inner surface of the substrate body 10A facing the liquid crystal layer 50.

The liquid crystal layer thickness reducing layer 21 is an insulating thin film provided to reduce the liquid crystal layer thickness. It is provided in the dot region partly, so as to cover the reflective layer 20. This liquid crystal layer thickness reducing layer 21 may be made of resin material, for example, acrylic resin. The dot region of the liquid crystal display 200 is separated into a reflective display region and a transmissive display region. In the reflective display region, the reflective layer 20 is provided. The opening 20*a* in the reflective layer 20 corresponds to the transmissive display region. The dot region has a multi-gap structure, that is to say, the thickness of liquid crystal layer 50 in the reflective display region is smaller than that in the transmissive display region because of existence of the liquid crystal layer thickness reducing layer 21. In the present exemplary embodiment, the slope N of the liquid crystal layer thickness reducing layer 21 is included in the reflective display region.

In a transflective liquid crystal display, uneven display can be less noticeable by disposing the TFD element in the reflective display region. That is to say, in the reflective display region, since ambient light passes through the liquid crystal layer two times, vision properties dependent on alignment direction of liquid crystal molecules are compensated between incident light and reflecting light, and uneven display caused by alignment disorder of liquid crystal can be less noticeable. In this configuration, however, since arrangement of the TFD element is restricted within the reflective display region, design flexibility is small. Particularly in the case of design with a high regard for the picture quality in the reflective display, it is difficult to enhance the aperture ratio of the reflective display region.

On the other hand, in the liquid crystal display according to the present exemplary embodiment, since the dielectric projection 55 is provided on the TFD element 40, alignment disorder of liquid crystal caused by intense electric field generated by the TFD element 40 is controlled effectively. Thus, uneven display around the TFD element 40 is reduced and substantial aperture ratio is enhanced. In this way, the TFD element 40 can be provided without distinction of the reflective display region or the transmissive display region, and flexible design is possible. Particularly in the case of design with a high regard for the reflective display, reflective display with high aperture ratio and brightness is achieved.

The liquid crystal display 200 according to the present exemplary embodiment is a transflective liquid crystal display having a multi-gap structure as described above. It can reduce or eliminate the phase difference in the liquid crystal layer 50 between the reflective display region and the transmissive display region, achieving high contrast display.

Although not shown in FIGS. 8 and 9, light scattering means may be provided at least in the reflective display region of the liquid crystal display according to the present exemplary embodiment. For example, a resin layer with an irregular surface may be interposed between the reflective layer 20 and the substrate body 10A so that the reflective layer has an irregular surface. Alternatively, a forward scattering film may be provided on the outer side of the element substrate 25.

In addition, to control alignment of the vertical mode liquid crystal layer 50 when a voltage is applied, an alignment controlling device (for example, opening slits 9*a* and 18) may be provided. In the case of the present exemplary embodiment, the alignment controlling device are disposed just above the slope N on the border between the reflective display region and the transmissive display region. This enables excellent alignment control of vertical alignment liquid crystal, generally keeping the aperture ratio of the dot region.

Third Exemplary Embodiment

Figure 10:
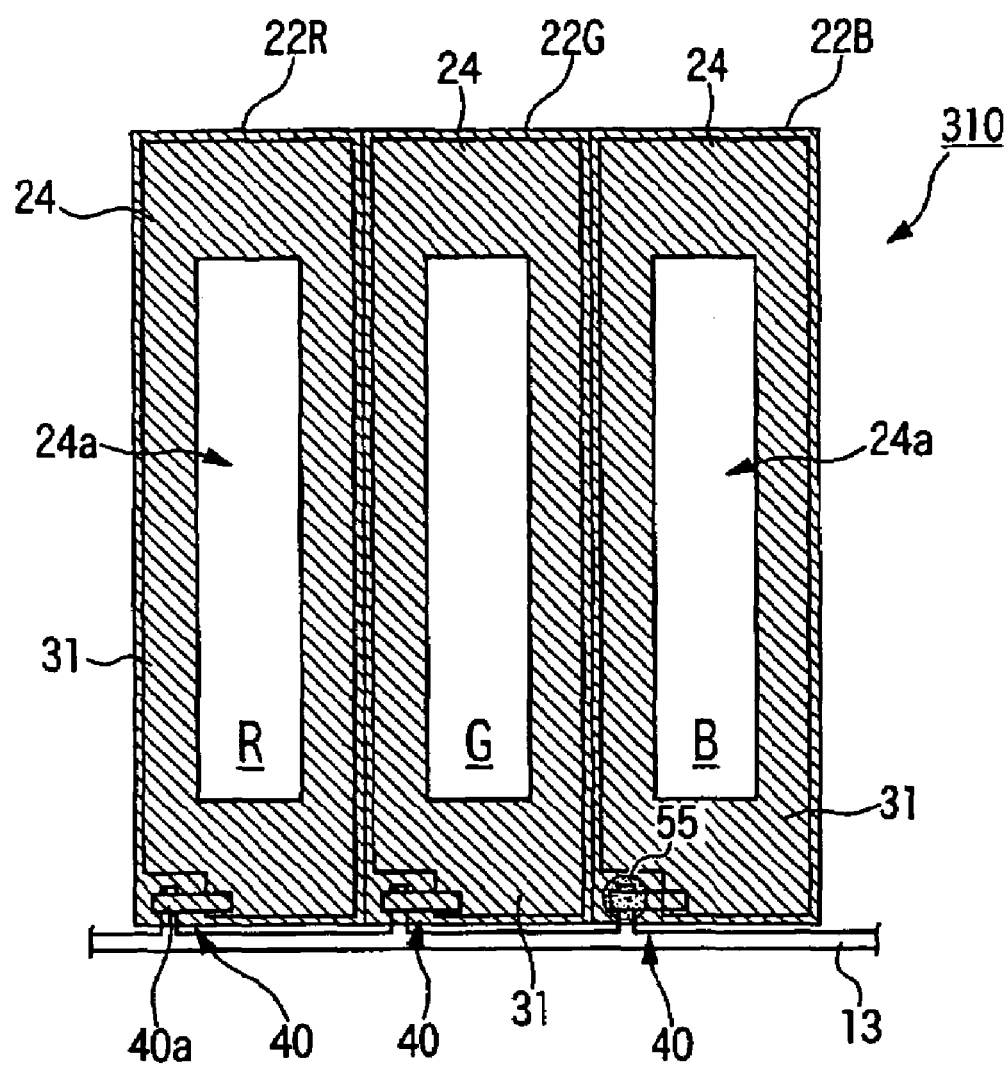
FIG. 10 is a plan view of a pixel in the liquid crystal display according to a third exemplary embodiment.
Figure 11:
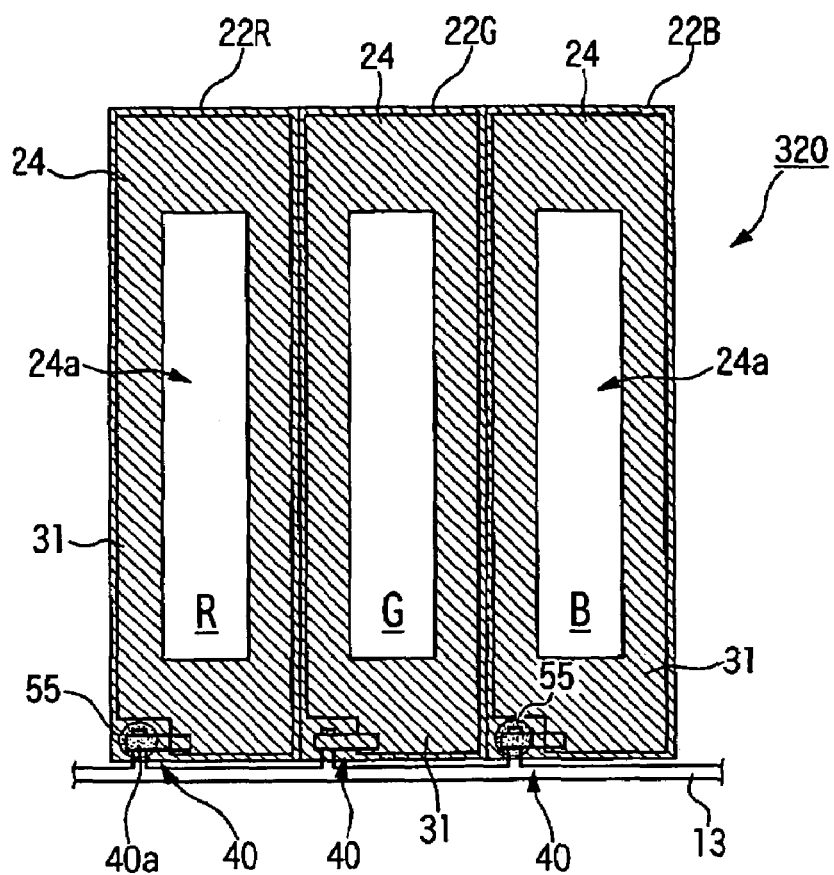
FIG. 11 is a plan view of a pixel in the liquid crystal display according to a third exemplary embodiment.

A third exemplary embodiment according to the present invention is described below with reference to FIGS. 10 and 11. FIG. 10 is a plan view of a pixel of the liquid crystal display 310 according to the present exemplary embodiment. FIG. 11 is a plan view of a pixel of the liquid crystal display 320 according to the present exemplary embodiment. The liquid crystal displays 310 and 320 according to the present exemplary embodiment have the same basic configuration as the liquid crystal display 200 according to the second exemplary embodiment, and they are characterized in arrangement of dielectric projections 55. Therefore, in FIGS. 10 and 11, the same reference numerals will be used to designate the same components as those in the first exemplary embodiment and the second exemplary embodiment, so that the detailed description will be omitted.

As shown in FIGS. 10 and 11, the liquid crystal displays 310 and 320 according to the present exemplary embodiment are transflective color liquid crystal displays. A color pixel consists of three dot regions provided with three colors of colorant layers 22R (red), 22G (green), and 22B (blue). Each dot region is provided with a frame-like reflective layer 24 with an opening 24*a*.

In a color pixel of the liquid crystal display 310, a dielectric projection (dielectric structure) 55 is provided under the TFD element 40 in the dot region of blue. In a color pixel of the liquid crystal display 320, two dielectric projections (dielectric structures) 55 are provided under the TFD elements 40 in the red dot region and the blue dot region. The dielectric projection 55 may have any shape shown FIGS. 7(*a*)-7(*g*) as in the first exemplary embodiment.

In the color pixel of liquid crystal displays 310 and 320, one or two dot regions (blue, or blue and red) are provided with dielectric projections 55. In these dot regions, alignment of liquid crystal is enhanced by the electric field blocking effect of the dielectric projections 55 and thereby brightness is enhanced. This compensates relatively low visibility of blue, or blue and red. Consequently, high quality display with no colored pixels is achieved.

In the liquid crystal displays 310 and 320 according to the present exemplary embodiment, since the dielectric projection 55 is disposed in the reflective display region (having the reflective layer 24), colors of a pixel consisting of three colors of dot regions can be balanced by the dielectric projection 55.

As described above, the dot region having the dielectric projection 55 is brighter because of enhancement in alignment of liquid crystal. Using this effect, by disposing the dielectric projection 55 in the dot regions of blue, or blue and red having relatively low visibility, chromaticity of reflective display can be tuned. That is to say, the dot regions of blue, or blue and red having relatively low visibility are provided with the dielectric projection 55, the area of the base or the height of the dielectric projection 55 being preferably greater in the dot region of blue having low visibility. On the other hand, the dot region of green having high visibility is not provided with the dielectric projection 55. Alternatively, although the dot region of green having high visibility is provided with the dielectric projection 55, the area of the base or the height of the dielectric projection 55 provided there is smaller than that of the dielectric projections 55 provided in the other dot regions.

his makes the chromaticity of reflective display relatively high in the blue dot region and relatively low in the green dot region. This achieves the same advantageous effect as in an area-color liquid crystal display in which colorant layers 22R, 22G, and 22B in the reflective display region are partly removed.

Exemplary Electronic Apparatus

Figure 12:
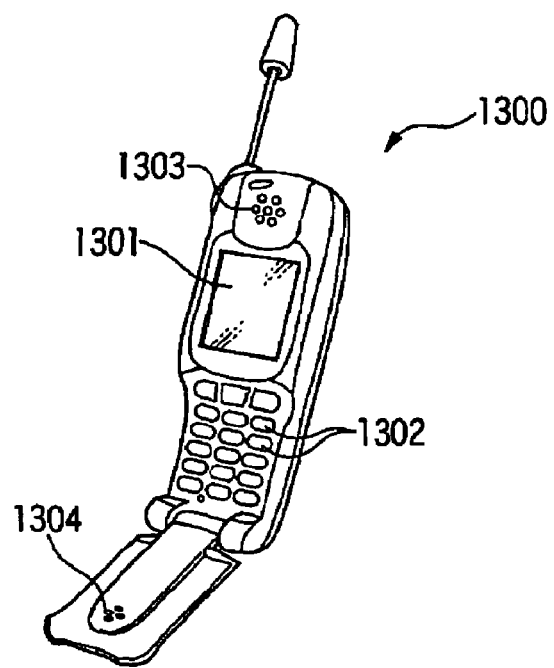
FIG. 12 is a perspective view showing an example of an electronic apparatus.

FIG. 12 is a perspective view showing an example of an electronic apparatus according to the present invention. A mobile phone 1300 has a display of an exemplary embodiment of the present invention as a small-size display 1301, in addition to a plurality of keys 1302, an earpiece 1303, and a mouthpiece 1304.

The displays of the above exemplary embodiments can be used as and are suitable for a display not only for a mobile phone but also for an electronic book reader, a personal computer, a digital still camera, a liquid crystal TV, a camcorder with an eyepiece-type viewfinder or a monitor-type viewfinder, a car navigation system, a pager, an electronic organizer, a calculator, a word processor, a workstation, a TV telephone, a point-of-sale (POS) terminal, a device with a touch panel, and so on, for example. In any electronic apparatus, bright, high contrast, and wide viewing angle display is possible.

What is claimed is:

1. A liquid crystal display, comprising:
    an element substrate having a plurality of dot regions, each dot region including a pixel electrode and a switching element;
    an opposite substrate opposing the element substrate; and
    a liquid crystal layer between the element substrate and the opposite substrate, the liquid crystal layer including liquid crystal with negative dielectric anisotropy, the initial alignment of molecules of the liquid crystal being vertical;
    at least one of the plurality of dot regions being provided with a dielectric structure on at least one of an inner side of the element substrate and the opposite substrate, the dielectric structure being located in the same position as the corresponding switching element in plan view;
    the plurality of dot regions being provided with different colors of colorant layers and constituting color pixels, and different dielectric structures having different shapes or sizes; and
    the area of the corresponding dielectric structure increasing as the visibility of the colorant layer decreases.

2. A liquid crystal display, comprising:
    an element substrate having a plurality of dot regions, each dot region including a pixel electrode and a switching element;
    an opposite substrate opposing the element substrate; and
    a liquid crystal layer between the element substrate and the opposite substrate, the liquid crystal layer including liquid crystal with negative dielectric anisotropy, the initial alignment of molecules of the liquid crystal being vertical;
    at least one of the plurality of dot regions being provided with a dielectric structure on at least one of an inner side of the element substrate and the opposite substrate, the dielectric structure being located in the same position as the corresponding switching element in plan view;
    the plurality of dot regions being provided with different colors of colorant layers and constituting color pixels, and different dielectric structures having different shapes or sizes; and
    the height of the corresponding dielectric structure increasing as the visibility of the colorant layer decreases.

* * * * *